(12) United States Patent
Lim et al.

(10) Patent No.: US 9,736,492 B2
(45) Date of Patent: Aug. 15, 2017

(54) MOTION VECTOR SMOOTHING METHOD AND APPARATUS

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Hyung-jun Lim, Suwon-si (KR); Hyun-wook Park, Daejeon (KR); Dong-yoon Kim, Daejeon (KR); Se-Hyeok Park, Seoul (KR); Tae-gyoung Ahn, Yongin-si (KR)

(73) Assignees: SAMSUNG ELECTRONICS CO., LTD., Suwon-si (KR); KOREA ADVANCED INSTITUTE OF SCIENCE AND TECHNOLOGY, Daejeon-si (KR)

( * ) Notice: Subject to any disclaimer, the term of this patent is extended or adjusted under 35 U.S.C. 154(b) by 298 days.

(21) Appl. No.: 14/579,445

(22) Filed: Dec. 22, 2014

(65) Prior Publication Data
US 2015/0245056 A1 Aug. 27, 2015

(30) Foreign Application Priority Data
Feb. 21, 2014 (KR) ........................ 10-2014-0020676

(51) Int. Cl.
*H04N 19/513* (2014.01)
*H04N 19/117* (2014.01)
(Continued)

(52) U.S. Cl.
CPC ......... *H04N 19/521* (2014.11); *H04N 19/117* (2014.11); *H04N 19/176* (2014.11); *H04N 19/198* (2014.11); *H04N 19/105* (2014.11)

(58) Field of Classification Search
None
See application file for complete search history.

(56) References Cited

U.S. PATENT DOCUMENTS

| 8,343,052 B2 | 1/2013 | Kawagishi et al. |
| 8,416,301 B2 | 4/2013 | Lindop et al. |
| (Continued) | | |

FOREIGN PATENT DOCUMENTS

| KR | 10-2003-0070278 A | 8/2003 |
| KR | 10-2007-0013986 A | 1/2007 |
| (Continued) | | |

OTHER PUBLICATIONS

Communication from the Korean Intellectual Property Office dated Oct. 13, 2014, in a counterpart Korean application No. 10-2014-0020676.

*Primary Examiner* — Thai Tran
*Assistant Examiner* — Christopher T Braniff
(74) *Attorney, Agent, or Firm* — Sughrue Mion, PLLC

(57) ABSTRACT

Disclosed is a motion vector smoothing method. The motion vector smoothing method includes acquiring motion vectors of at least one block of a current image by using a reference image, acquiring a candidate motion vector of a current block, based on a motion vector of the current block, and at least one motion vector of at least one block adjacent to the current block, determining a threshold value of the current block according to gradient values of pixels included in the current block, and determining the motion vector of the current block according to the threshold value.

15 Claims, 4 Drawing Sheets

(51) Int. Cl.
*H04N 19/176* (2014.01)
*H04N 19/196* (2014.01)
*H04N 19/105* (2014.01)

(56) References Cited

U.S. PATENT DOCUMENTS

| | | | |
|---|---|---|---|
| 2003/0163281 A1* | 8/2003 | Yang | H04N 5/145 |
| | | | 702/150 |
| 2007/0038090 A1 | 2/2007 | Moon et al. | |
| 2010/0016722 A1 | 1/2010 | Shin et al. | |
| 2011/0069237 A1* | 3/2011 | Wang | H04N 5/145 |
| | | | 348/699 |
| 2012/0259223 A1 | 10/2012 | Tsujita | |
| 2014/0010307 A1* | 1/2014 | Gilmutdinov | H04N 7/0132 |
| | | | 375/240.16 |

FOREIGN PATENT DOCUMENTS

| | | |
|---|---|---|
| KR | 10-2010-0008432 A | 1/2010 |
| WO | 2011/086774 A1 | 7/2011 |

\* cited by examiner

MOTION VECTOR SMOOTHING METHOD AND APPARATUS

CROSS-REFERENCE TO RELATED APPLICATION

This application claims the benefit of Korean Patent Application No. 10-2014-0020676, filed on Feb. 21, 2014, in the Korean Intellectual Property Office, the disclosure of which is incorporated herein in its entirety by reference.

BACKGROUND

1. Field

One or more exemplary embodiments relate to a method and apparatus for smoothing a motion vector of an image.

2. Description of the Related Art

A motion compensated frame interpolation (MCFI) method in consideration of motion information is being used for providing a high-quality image. In the MCFI method, an image processing apparatus estimates a motion between a previous image and a current image, and generates a motion-compensated interpolation image on the basis of the estimated motion. In other words, the image processing apparatus extracts a motion vector between two adjacent frames depending on motion prediction, and generates an interpolation image, which is an intermediate frame, by using a half value of the motion vector.

In this case, the motion vector estimated based on the motion prediction may differ from a true motion due to noise of an image, a brightness change, and a shape change of a motion object. Image-quality degradation phenomena, such as a blocking phenomenon, a ghost deterioration phenomenon, and a shape change of a moving object, may occur in an interpolation image which is generated based on a motion vector differing from a true motion.

A motion vector is smoothed by performing a motion vector smoothing operation, and thus is processed and output close to a true motion. However, a motion vector of an adjacent block is used in smoothing the motion vector, and thus, when a difference between a true motion vector of an adjacent block and a true motion vector of a current block is large, the smoothed motion vector may also have a motion vector value having a large difference with respect to the true motion.

SUMMARY

One or more embodiments of the present invention include a method and apparatus for smoothing a motion vector of an image, which smooth a motion vector of each block of an image depending on a characteristic of each block.

Additional aspects will be set forth in part in the description which follows and, in part, will be apparent from the description, or may be learned by practice of the presented exemplary embodiments.

According to one or more exemplary embodiments, a motion vector smoothing method includes acquiring motion vectors of at least one block of a current image by using a reference image, acquiring a candidate motion vector of a current block and at least one motion vector of at least one block adjacent to the current block, determining a threshold value of the current block according to gradient values of pixels included in the current block, and determining the motion vector of the current block according to the threshold value.

The determining of the motion vector may include acquiring a block of the reference image corresponding to the current block according to the candidate motion vector of the current block, determining a difference value between a pixel value of the acquired block of the reference image and a pixel value of the current block, comparing the determined threshold value and the determined difference value, and determining the motion vector of the current block by using the candidate motion vector according to the comparison result.

The determining of the difference value may include determining a block, having a small difference value between a pixel of the block and the pixel value of the current block, from a block of a previous image, corresponding to the current block of the current image, and a block of a next image, corresponding to the current block of the current image; and determining the difference value according to the determination result.

The determining of the threshold value may include determining the threshold value of the current block using a level of noise included in the current block.

The determining of the threshold value may include summating at least one of gradient values of each of a plurality of pixels, included in a single block, in an X axis direction and a Y axis direction, and determining the threshold value of the current block, based on the summated value.

The acquiring of the candidate motion vector may include determining at least one candidate motion vector from among the motion vector of the current block and the motion vectors of the at least one block adjacent to the current block, and determining a priority of the at least one candidate motion vector, and the determining of the motion vector may include determining the motion vector of the current block according to the threshold value, based on the priority of the at least one candidate motion vector.

The determining of the motion vector may include comparing the threshold value and a pixel value difference between a pixel value of a block of the reference image and a pixel value of a block of the current image according to a highest-priority candidate motion vector, wherein the block of the reference image corresponding to the block of the current image, determining whether to determine the highest-priority candidate motion vector as the motion vector of the current block, according to the comparison result, and determining a next-priority candidate motion vector as the motion vector of the current block according to the determination result, based on the threshold value.

The determining of the priority may include determining the priority according to a difference value between the at least one candidate motion vector and a motion vector of a block adjacent to the current block.

The candidate motion vector of the current block may be based on a motion vector of the current block.

According to one or more exemplary embodiments, a motion vector smoothing apparatus includes a motion vector acquirer configured to acquire motion vectors of at least one block of a current image by using a reference image, a candidate motion vector acquirer configured to acquire a candidate motion vector of a current block and at least one motion vector of at least one block adjacent to the current block, a threshold value determiner configured to determine a threshold value of the current block according to gradient values of pixels included in the current block, and a motion vector smoother configured to determine the motion vector of the current block according to the threshold value.

The motion vector smoother may acquire a block of the reference image corresponding to the current block according to the candidate motion vector of the current block, may determine a difference value between a pixel value of the acquired block of the reference image and a pixel value of the current block, may compare the determined threshold value and the determined difference value, and may determine the motion vector of the current block by using the candidate motion vector according to a result of the comparing.

The motion vector smoother may determine a block, having a small difference value between a pixel of the block and the pixel value of the current block, from a block of a previous image, corresponding to the current block of the current image, and a block of a next image, corresponding to the current block of the current image, and may determine the difference value according to a result of the determining.

The threshold value determiner may determine the threshold value of the current block using a level of noise included in the current block.

The threshold value determining unit may summate at least one gradient values of each of a plurality of pixels, included in a single block, in an X axis direction and a Y axis direction, and may determine the threshold value of the current block, based on the summated value.

The candidate motion vector acquirer may determine at least one candidate motion vector from among the motion vector of the current block and the motion vectors of the at least one block adjacent to the current block, and may determine a priority of the at least one candidate motion vector, and the motion vector smoother may determine the motion vector of the current block according to the threshold value, based on the priority of the at least one candidate motion vector.

The motion vector smoother may compare the threshold value and a pixel value difference between a pixel value of a block of the reference image and a pixel value of a block of the current image according to a highest-priority candidate motion vector, where the block of the reference image corresponds to the block of the current image, may determine whether to determine the highest-priority candidate motion vector as the motion vector of the current block, according to a result of the comparing, and may determine a next-priority candidate motion vector as the motion vector of the current block according to a result of the determining, based on the threshold value.

The candidate motion vector acquirer may determine the priority according to a difference value between the at least one candidate motion vector and a motion vector of a block adjacent to the current block.

The candidate motion vector of the current block may be based on a motion vector of the current block.

According to one or more exemplary embodiments, provided is a non-transitory computer-readable storage medium storing a program for executing the motion vector smoothing method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
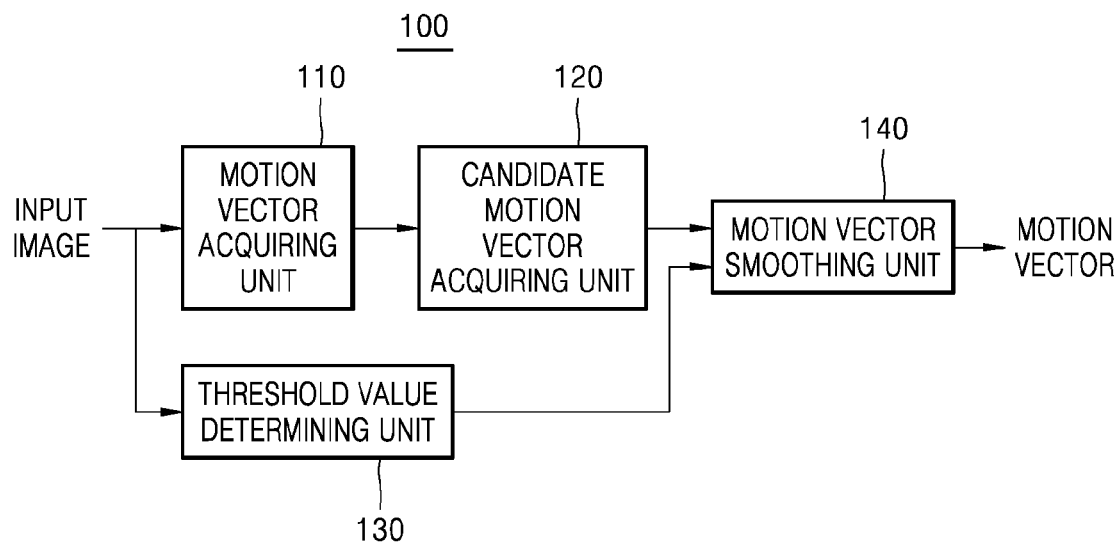
FIG. 1 is a block diagram illustrating an internal configuration of a motion vector smoothing apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

Hereinafter, exemplary embodiments will be described in detail with reference to the accompanying drawings. In the following description, when the detailed description of the relevant known function or configuration is determined to unnecessarily obscure the important point of the present invention, the detailed description will be omitted. Like reference numerals refer to like elements throughout.

The terms or words used in the present specification and claims, limited to common or dictionary meaning is not to be construed terms appropriately for the best explanation of his own invention, the inventor should be interpreted based on the meanings and concepts corresponding to technical aspects of the exemplary embodiment can be defined on the basis of the principle. Therefore, the configuration shown in the drawings are exemplary embodiments described herein, and nothing in the most preferred exemplary embodiment only and does not represent all of the technical ideas of the exemplary embodiments, as in effect at the time of this application, you can replace them, and it should be understood that various equivalents.

In this disclosure below, when it is described that one comprises (or includes or has) some elements, it should be understood that element may comprise (or include or has) only those elements, or the element may comprise (or include or have) other elements as well as those elements if there is no specific limitation. Moreover, each of terms such as " . . . unit", " . . . apparatus" and "module" described in specification denotes an element for performing at least one function or operation, and may be implemented in hardware, software or the combination of hardware and software.

Exemplary embodiments capable of being easily embodied by those of ordinary skill in the art will now be described in detail with reference to the accompanying drawings. The exemplary embodiments may, however, be in many different forms and should not be construed as being limited to the exemplary embodiments set forth herein. In the accompanying drawings, a portion irrelevant to a description of the exemplary embodiments will be omitted for clarity.

The term "image" used herein may be used, in addition to "image" itself, as a comprehensive term, such as "frame", "field", and "slice", for describing various types of video image information known in the related art.

Hereinafter, exemplary embodiments will be described in detail with reference to the accompanying drawings.

FIG. 1 is a block diagram illustrating an internal configuration of a motion vector smoothing apparatus 100 according to an exemplary embodiment.

The motion vector smoothing apparatus 100 may divide an image into at least one or more blocks, and smooth a motion vector of each of the blocks to be close to a true motion by using a motion vector of an adjacent block. In particular, the motion vector smoothing apparatus 100 may determine a threshold value depending on variances of pixels included in each block, and determine whether to determine the smoothed motion vector as a motion vector of a current block, by using a motion vector of an adjacent block according to the determined threshold value.

Assuming that there is a true motion vector between adjacent blocks, the motion vector smoothing apparatus 100 may smooth a motion vector of a current block, which is extracted depending on motion prediction, by using motion vectors of blocks adjacent to the current block. For example, a median vector of a motion vector of an adjacent block may be determined as a motion vector of a current block by a median filtering method. The median vector may be determined as a motion vector having the smallest difference with respect to motion vectors of blocks adjacent to the current block, or may be one of the motion vectors of the blocks adjacent to the current block. The motion vector smoothing apparatus 100 may acquire the median vector as a candidate motion vector, and use the median vector for smoothing the motion vector of the current block.

In addition, as described above, the motion vector smoothing apparatus 100 according to an exemplary embodiment may determine a motion vector of a current block according to a threshold value which is determined according to characteristics (i.e., variances of pixels included in the current block) of the pixels included in the current block. Therefore, the motion vector smoothing apparatus 100 determines a motion vector according to a characteristic of the current block, thereby preventing a motion vector having a large difference with respect to a true motion vector of the current block from being determined as the motion vector of the current block. A method of determining a motion vector depending on a characteristic of a current block will be described in detail in descriptions associated with a threshold value determining unit 130 and a motion vector smoothing unit 140.

Referring to FIG. 1, the motion vector smoothing apparatus 100 according to an exemplary embodiment may include a motion vector acquiring unit (i.e., motion vector acquirer) 110, a candidate motion vector acquiring unit (i.e. candidate motion vector acquirer) 120, the threshold value determining unit (i.e. threshold value determiner) 130, and the motion vector smoothing unit (i.e. motion vector smoother) 140.

The motion vector smoothing apparatus 100 may smooth a motion vector acquired by the motion vector acquiring unit 110 by using the candidate motion vector acquiring unit 120, the threshold value determining unit 130, and the motion vector smoothing unit 140.

The motion vector acquiring unit 110 may acquire a motion vector of each of at least one or more blocks included in an image by using a reference image. The motion vector acquiring unit 110 may acquire a block, which is the most similar to a current block, from the reference image, and acquire a motion vector, indicating to which position the current block is moved in the reference image, by using the acquired block of the reference image. Here, the reference image may be one from among a previous image and a next image in terms of a time sequence of a current image. The motion vector acquiring unit 110 may determine the previous image or the next image as the reference image according to whether a corresponding image includes a block which is the most similar to the current block, thereby acquiring a motion vector of each block. The following description will be made on the assumption that the reference image is the previous image.

For example, the motion vector acquiring unit 110 may acquire a motion vector "$\hat{v}$" from a current block "B" according to the following Equations (1) and (2):

$$\hat{v} = \underset{v \in V}{\mathrm{argmin}}\{SBAD(B, v)\} \quad (1)$$

where V denotes a set of motion vectors which may be determined according to a block of a previous image corresponding to the current block "B", the motion vector "$\hat{v}$" denotes a motion vector "v" having a minimum SBAD(B, v). SBAD(B, v) will be described in detail in association with the following Equation (2):

$$SBAD(B, v) = \sum_{(x,y) \in B} |I_{t-1}(x + v_x, y + v_y) - I_t(x, y)| \quad (2)$$

where SBAD (sum of backward absolute difference) denotes the sum of difference values between pixel values of the current block and a block of the previous image. In this case, the block of the previous image is a block corresponding to the current block according to a motion vector "v($v_x$, $v_y$)". $I_{t-1}$ denotes the previous image, $I_t$ denotes the current image, x denotes a value for representing an X-axis position of each pixel included in the block "B", and y denotes a value for representing a Y-axis position of each pixel included in the block "B".

The motion vector acquiring unit 110 may acquire a motion vector having a minimum SBAD value, which is the sum of difference values between pixel values of the current block and a block of the previous image, according to Equations (1) and (2). In more detail, the motion vector acquiring unit 110 may compare blocks of the current image and previous image within a predetermined search range of the previous image to acquire a block of the previous image in which an SBAD value (which is a difference between the current image and previous image) is the smallest. The motion vector acquiring unit 110 may acquire a motion vector of the current block by using the acquired block of the previous image.

However, according to the above-described motion vector acquiring method, since a motion vector having a minimum SBAD value is estimated, a motion vector having a large difference with respect to a true motion vector may be selected. That is, since the SBAD value is a value which is acquired by calculating a value in which a difference between a pixel value of a block of a previous image and a pixel value of a current block is the smallest, a block of the previous image which does not correspond to an object of a current block may be selected as a block which is the most similar to the current block. Therefore, the below-described motion vector smoothing unit 140 may perform an operation of smoothing a motion vector so as to acquire a motion vector close to a true motion vector. That is, the motion vector smoothing unit 140 may determine whether to determine a motion vector, which is acquired from a motion vector of an adjacent block, as a motion vector of a current block according to a threshold value which is determined based on a characteristic of the current block.

The candidate motion vector acquiring unit 120 may acquire a candidate motion vector of a current block on the basis of at least one of a motion vector of a current block and motion vectors of blocks adjacent to the current block. The below-described motion vector smoothing unit 140 may smooth the motion vector of the current block by using a plurality of the candidate motion vectors acquired by the candidate motion vector acquiring unit 120. According to an exemplary embodiment, the candidate motion vector may be a vector, having a motion vector value which is the most similar to motion vectors of adjacent blocks, on the assumption that the adjacent blocks have similar true motion vectors. Also, the candidate motion vector may be determined from among the motion vector of the current block and the motion vectors of the blocks adjacent to the current block.

For example, the candidate motion vector acquiring unit 120 may determine, as the candidate motion vector, at least one from among the motion vector of the current block and the motion vectors of the blocks adjacent to the current block. In this case, the candidate motion vector acquiring unit 120 may determine, as the candidate motion vector, a motion vector value in which a difference between a motion vector value of the current block and motion vector values of the blocks adjacent thereto is the smallest.

When a motion vector of a current block is v0 and respective motion vectors of eight blocks adjacent to the current block are v1 to v8, a candidate motion vector may be determined as one of v0 to v8. The candidate motion vector may be determined as a motion vector having the smallest difference value with the motion vectors "v0" to "v8".

For example, when a value of v0 is 2 and values of v1 to v8 are 0, a motion vector having the smallest difference value of the motion vectors "v0" to "v8" is 0, which is the value of each of v1 to v8, and thus, a candidate motion vector may be determined as 0.

In addition, the candidate motion vector acquiring unit 120 may acquire at least one candidate motion vector of which a priority is determined. Here, the priority may be determined in ascending order of differences between the candidate motion vector and motion vectors of a current block and blocks adjacent thereto. For example, when a value of v0 is 2 and a value of each of v1 to v8 are 0, a motion vector value "0" having the smallest difference value with the motion vectors "v0" to "v8" may be determined as a value having the highest priority, and a value "2" of v0 may have the second highest priority after the highest priority.

The candidate motion vector acquiring unit 120 may acquire at least one candidate motion vector, of which a priority is determined, according to the following Equations (3) and (4):

$$v_c^k = \underset{v \in V_N^k}{\operatorname{argmin}}\{MVD(v)\}, k = 0, V_N^k = \{v^0, v^1, \ldots, v^8\} \quad (3)$$

$$MVD(v) = \sum_{i=0}^{8} (|v_x^i - v_x| + |v_y^i - v_y|) \quad (4)$$

where $v_N^k = \{v^0, v^1, \ldots, v^8\}$ denotes a set of motion vectors, acquired by the motion vector acquiring unit 110, of a current block and blocks adjacent to the current block. The set of the motion vectors may include at least one from among the motion vector of the current block and motion vectors of a maximum of eight blocks adjacent to the current block. A candidate motion vector may be determined from among the motion vectors included in the set of the motion vectors. The variable $v_c^k$ denotes at least one candidate motion vector determined from among the motion vectors included in the set of the motion vectors, and the candidate motion vector may further include priority information corresponding thereto. That is, $v_c^k$ may denote at least one candidate motion vector having a priority according to a difference (i.e., an MVD(v) value) with respect to the motion vectors included in the set of the motion vectors. Here, a candidate motion vector having a minimum MVD(v) value may have the highest priority. That is, a candidate motion vector having the smallest difference with respect to the motion vectors included in the set of the motion vectors may have the highest priority.

In Equation (4), the MVD(v) value denotes the sum of difference values between the motion vector "v" and the motion vectors included in the set of the motion vectors.

For example, a MVD(v0) value may denote the sum of differences between v0 and the motion vectors (i.e., v0 to v8) included in the set of the motion vectors, namely the sum of a difference between v0 and v0, a difference between v0 and v1, a difference between v0 and v2, a difference between v0 and v3, a difference between v0 and v4, a difference between v0 and v5, a difference between v0 and v6, a difference between v0 and v7, and a difference between v0 and v8. In this case, as expressed in Equation 4, the candidate motion vector acquiring unit 120 may divide each vector into an X axis component and a Y axis component to acquire a difference value between sizes of the X and Y axis components, thereby obtaining an MVD value. An MVD (v1) value may denote the sum of differences between v1 and v0 to v8.

When a set of motion vectors includes the motion vectors "v0" to "v8", the candidate motion vector acquiring unit 120 may acquire an MVD(v0) value to an MVD(v8) value, and determine a motion vector having the smallest MVD value as a candidate motion vector. Alternatively, the candidate motion vector acquiring unit 120 may determine priorities of the motion vectors "v0" to "v8" in ascending order of MVD values, and acquire at least one candidate motion vector of which a priority is determined.

In addition, whether to determine a candidate motion vector as a motion vector of a current block may be determined based on a threshold value determined by the threshold value determining unit 130 in a priority order.

The threshold value determining unit 130 may determine a threshold value of a current block depending on characteristics of pixels included in the current block. The threshold value determining unit 130 may determine the threshold value of the current block on the basis of gradient values of pixels included in the current block.

Each of the gradient values of pixels included in the current block may be determined as the sum of difference values between pixels adjacent to the pixels included in the current block. Also, each gradient value is a value indicating a variance of a pixel value of the current block, an edge intensity of a pixel value, and texture intensity. For example, each of the gradient values of pixels included in the current block may be acquired from the sum of difference values between adjacent pixels which are provided in an X axis direction and a Y axis direction of each pixel.

The threshold value determining unit 130 may determine the threshold value of the current block according to the following Equations (5) to (7):

$$I(x, y, t) = \tag{5}$$
$$I(x + \delta x, y + \delta y, t + \delta t) \sum_{(x,y) \in B} |(I_t(x, y) - I_{t-1}(x + \bar{v}_x, y + \bar{v}_y))| =$$
$$\sum_{(x,y) \in B} |g_x \Delta v_x + g_y \Delta v_y| \leq \sum_{(x,y) \in B} (|g_x| + |g_y|)$$

$$\therefore SBAD(B, \bar{v}) \leq \sum_{(x,y) \in B} (|g_x| + |g_y|) \tag{6}$$

$$\therefore Th(B) = \sum_{(x,y) \in B} (|g_x| + |g_y|) + k \tag{7}$$

The threshold value according to an exemplary embodiment may be acquired from an optical flow equation. The optical flow equation uses an assumption that a pixel intensity value at a current time "t" has the same intensity value at a pixel after a very short time "δt" elapses. The optical flow equation may be defined as expressed in Equation (5).

The optical flow equation of Equation (5) may be arranged by using a Taylor series, and may be expressed as Equation (6) by using an integer value "$(\bar{v}_x\text{-}\bar{v}_y)$" and a decimal value "$(\Delta v_x, \Delta v_x)$" of a true motion vector. The variable $(\bar{v}_x\text{-}\bar{v}_y)$ denotes an integer pixel unit component of a motion vector, and $(\Delta v_x, \Delta v_x)$ denotes a decimal pixel unit component of the motion vector.

In Equations (6) and (7), $g_x$ denotes a gradient value of each pixel in an X axis direction and $g_y$ denotes a gradient value of each pixel in a Y axis direction. The variable $g_x$ may denote the sum of difference values between adjacent pixels in the X axis direction of each pixel, and $g_y$ may denote the sum of difference values between adjacent pixels in the Y axis direction of each pixel.

Referring to Equation (6), an SBAD value being equal to or less than the sum of all gradient values of pixels included in a block may be obtained from the optical flow equation. The motion vector smoothing apparatus 100 according to an exemplary embodiment may set a threshold value as the sum of all gradient values of pixels included in a block by using Equation (6), and compare an SBAD value of a candidate motion vector with the threshold value. That is, when the SBAD value of the candidate motion vector is equal to or less than the threshold value, the motion vector smoothing apparatus 100 may determine the candidate motion vector as a motion vector of a current block.

When the SBAD value is greater than the threshold value, the motion vector smoothing apparatus 100 may compare the threshold value with an SBAD value of a candidate motion vector having a next priority. Also, when there is no candidate motion vector having the next priority, the motion vector smoothing apparatus 100 may determine a motion vector of a current block as a motion vector of the current block acquired by the motion vector acquiring unit 110.

Furthermore, irrespective of whether a candidate motion vector is acquired from a block of a previous image or a next image by the motion vector acquiring unit 110, when a block corresponding to a current block is a block of the next image depending on the same candidate motion vector, the motion vector smoothing apparatus 100 may compare the threshold value with an SFAD (sum of forward absolute difference) value instead of the SBAD value.

In Equation (7), Th(B) denotes a threshold value of a current block "B", and in consideration of a case where a gradient value greater than a true gradient value is acquired when noise is included in the current block, k denotes a constant value which is used to compensate for the acquired gradient value.

In an exemplary embodiment, a threshold value may indicate characteristics of a current block such as variances of pixels of the current block, an edge intensity of a pixel value, and texture intensity. Therefore, the motion vector smoothing apparatus 100 according to an exemplary embodiment may determine whether to determine an acquired candidate motion vector as a motion vector of a current block, on the basis of a motion vector of a current block and a motion vector of a block adjacent thereto and a characteristic of the current block.

When motion vectors of adjacent blocks have similar values and have a large difference with respect to a true motion vector of a current block, a candidate motion vector having the minimum MVD(v) value may have a value closer to motion vector values of the adjacent blocks than a motion vector value of the current block. Also, when a priority is predetermined, as the priority determined based on the MVD(v) value increases, the candidate motion vector may have the value closer to the motion vector values of the adjacent blocks than the motion vector value of the current block.

Therefore, in order to prevent a high-priority candidate motion vector (having a value closer to motion vector values of adjacent blocks than a motion vector value of a current block) from being determined as a motion vector of the current block, the motion vector of the current block may be determined based on a threshold value which is determined according to a characteristic of the current block. That is, whether to determine a candidate motion vector as the motion vector of the current block may be determined based on a threshold value which is determined depending on the characteristic of the current block.

For example, when variances of pixels included in a current block are high, a threshold value becomes higher, and thus, a possibility increases that a candidate motion vector close to a motion vector value of an adjacent block is determined as a motion vector of the current block. On the other hand, when the variances of the pixels included in the current block are low, the threshold value becomes lower, and thus, the possibility is reduced that the candidate motion vector close to the motion vector value of the adjacent block is determined as the motion vector of the current block.

For example, when a current block includes one moving object and blocks adjacent to the current block include a background, variances of pixels may be low compared to the background because the current block includes the one moving object. Also, motion vectors of the blocks adjacent to the current block may differ, and the motion vectors of the adjacent blocks may have similar values.

A candidate motion vector, acquired based on a motion vector of a current block and a motion vector of an adjacent block, or a candidate motion vector having a high priority may have a value close to a motion vector of a background included in the adjacent block as described above. However, according to an exemplary embodiment, since a threshold value of the current block is low, there is a possibility that the candidate motion vector is determined as the motion vector of the current block. Also, since the threshold value of the current block is low, the candidate motion vector may be determined as the motion vector of the current block when a difference with respect to a reference image block, corresponding to the candidate motion vector, is small.

Therefore, according to an exemplary embodiment, when most of adjacent blocks include a background because a size of an object of a current block is small, a candidate motion vector having a value close to a motion vector of the background is prevented from being determined as a motion vector of the current block. Alternatively, even when most of motion vectors of the adjacent blocks have a large difference with respect to a true motion vector of the current block, a candidate motion vector having a value close to a motion vector of an adjacent block is prevented from being determined as the motion vector of the current block.

The motion vector smoothing unit 140 may determine a motion vector of a current block according to a threshold value determined by the threshold value determining unit 130. For example, the motion vector smoothing unit 140 may compare the threshold value with the lesser of an SBAD value and an SFAD value to determine the motion vector of the current block according to the following Equations (8) and (9):

$$C(B, v_c^k) = \min\{SBAD(B, v_c^k), SFAD(B, v_c^k)\} \quad (8)$$

$$SFAD(B, v) = \sum_{(x,y) \in B} |I_{t+1}(x - v_x, y - v_y) - I_t(x, y)| \quad (9)$$

According to Equation (6), the SBAD value has been described compared to the threshold value, but the present embodiment is not limited thereto. The motion vector smoothing apparatus 100 may perform a comparison of the SFAD value in further consideration of an SFAD value of the same candidate motion vector. Such an operation may be performed irrespective of whether the candidate motion vector is acquired from a block of a previous image or a next image by the motion vector acquiring unit 110. That is, even when the candidate motion vector is acquired from the block of the previous image, the motion vector smoothing apparatus 100 may acquire a block, corresponding to a current image, from the next image according to the same candidate motion vector, calculate an SFAD value, and compare the SFAD value with the threshold value.

The SFAD value denotes the sum of difference values between pixel values of the current block and a block of the next image. Here, the block of the next image is a block of the next image corresponding to the current block according to a candidate motion vector "$v(v_x, v_y)$". The variable $I_{t+1}$ denotes a next image, $I_t$ denotes a current image, and x and y denote position information of a pixel which is used to identify the pixel.

A current block is included in an occlusion region, and when a candidate motion vector is a true motion vector, an SBAD value may be less than an SFAD value. Therefore, the motion vector smoothing unit 140 may compare a threshold value with the lesser of an SBAD value and SFAD value of the same candidate motion vector to determine whether to determine the candidate motion vector as a motion vector of the current block.

A method, in which the motion vector smoothing apparatus described above with reference to FIGS. 2 and 3 smoothes a motion vector, will be described in detail below.

Figure 2:
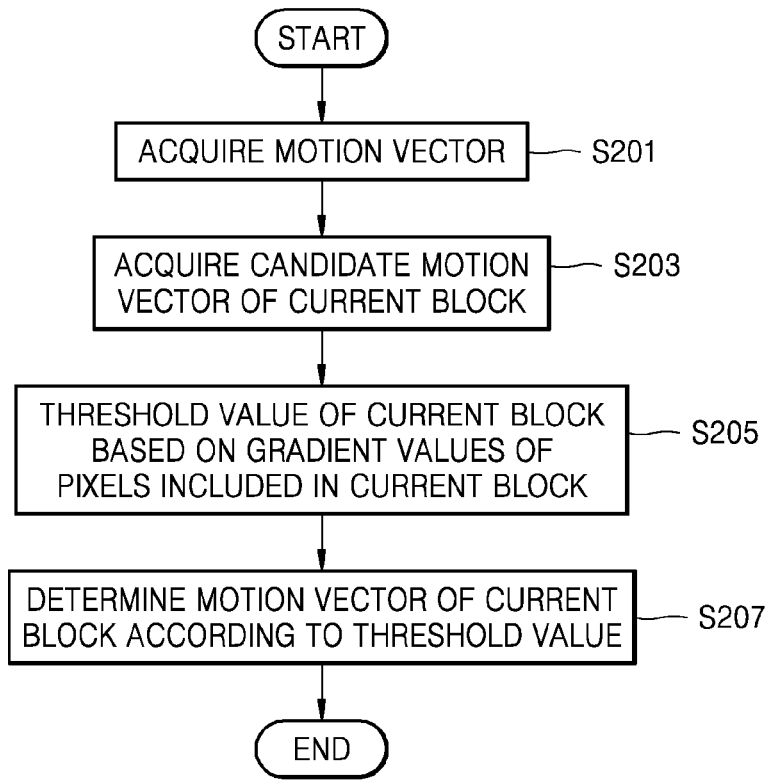
FIGS. 2 and 3 are flowcharts illustrating a motion vector smoothing method according to an exemplary embodiment.
Figure 3:
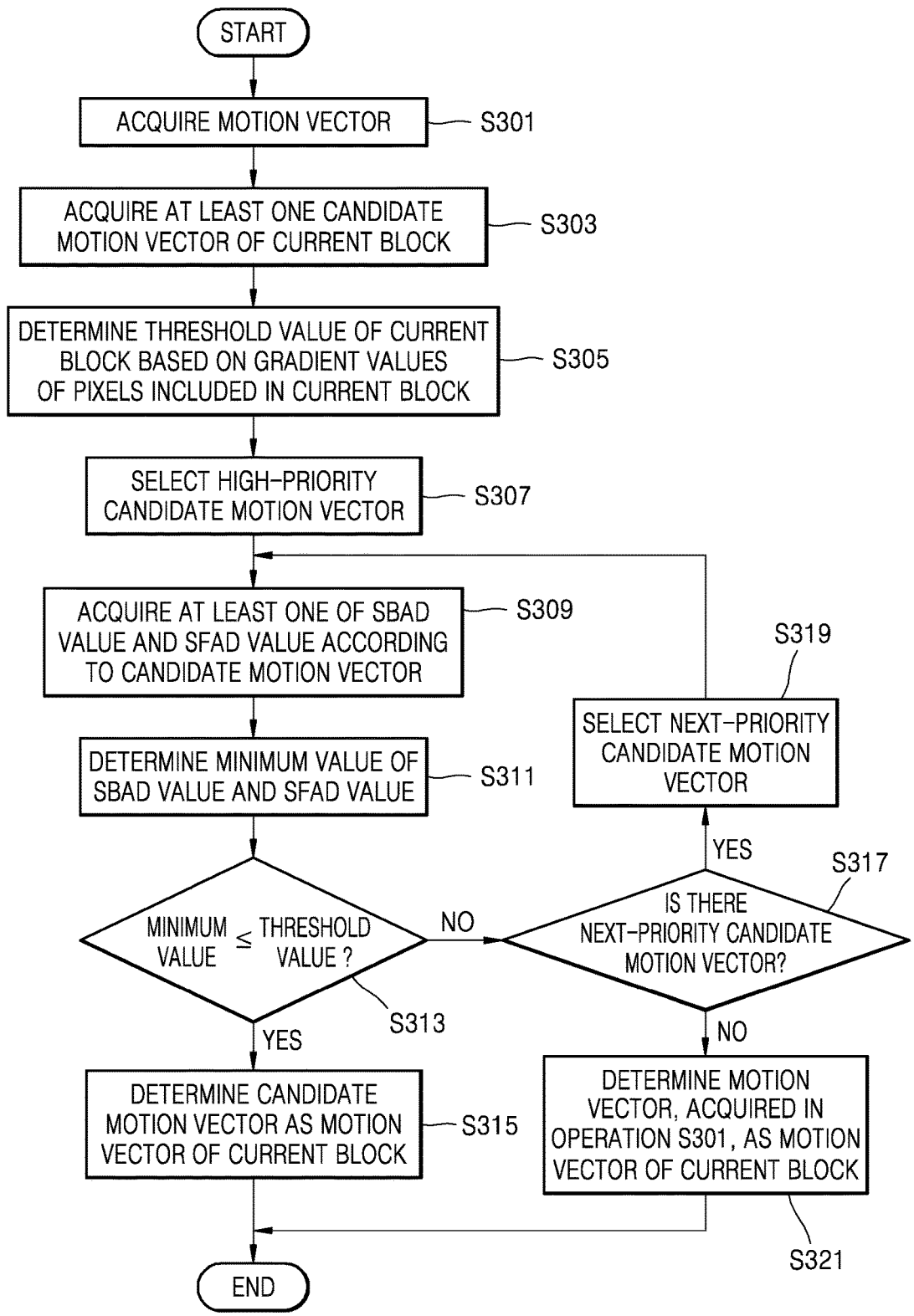

FIGS. 2 and 3 are flowcharts illustrating a motion vector smoothing method according to an exemplary embodiment of the present invention.

Referring to FIG. 2, in operation S201, the motion vector smoothing apparatus 100 may acquire a motion vector for each of a plurality of blocks included in a current image. In this case, blocks from which a motion vector is acquired may include blocks which are predictable according to an inter-prediction method.

In operation S203, the motion vector smoothing apparatus 100 may acquire a candidate motion vector of a current block on the basis of the motion vector which is acquired in operation S201. That is, the motion vector smoothing apparatus 100 may acquire the candidate motion vector of the current block on the basis of a motion vector of the current block (which is acquired in operation S201) and motion vectors of blocks adjacent to the current block.

In operation S205, the motion vector smoothing apparatus 100 may determine a threshold value of the current block on the basis of gradient values of pixels included in the current block. The gradient value may be the sum of difference values between pixels adjacent to each pixel. The threshold value of the current block may be determined as a gradient value which is considered as a characteristic of the pixels included in the current block.

In operation S207, the motion vector smoothing apparatus 100 may determine the candidate motion vector (which is acquired in operation S203) as the motion vector of the current block according to the threshold value. To provide a detailed description, the motion vector smoothing apparatus 100 may compare the threshold value with a value, which is determined based on the candidate motion vector, to determine whether the candidate motion vector is the motion vector of the current block. In this case, the value determined based on the candidate motion vector may include the above-described SBAD value or SFAD value.

Hereinafter, a method of determining a motion vector of a current block, by using a plurality of candidate motion vectors whose priorities are determined, will be described in detail with reference to FIG. 3.

Referring to FIG. 3, in operation S301, the motion vector smoothing apparatus 100 may acquire a motion vector for each of a plurality of blocks included in a current image. In this case, blocks from which a motion vector is acquired may include blocks which are predictable according to the inter-prediction method.

In operation S303, the motion vector smoothing apparatus 100 may acquire at least one candidate motion vector of a current block on the basis of the motion vector which is acquired in operation S301. That is, the motion vector smoothing apparatus 100 may acquire the candidate motion vector of the current block on the basis of a motion vector of the current block (which is acquired in operation S301) and motion vectors of blocks adjacent to the current block. In operation S303, the candidate motion vector may be at least one from among the motion vector of the current block and the motion vectors of blocks adjacent to the current block, and a priority may be determined according to the above-described MVD(v) value, namely, a difference value between the motion vector of the current block and the motion vector of each of the adjacent blocks.

In operation S305, the motion vector smoothing apparatus 100 may determine a threshold value of the current block on the basis of gradient values of pixels included in the current block. The gradient value may be the sum of difference values between pixels adjacent to each pixel. The threshold value of the current block may be determined as a gradient value which is considered a characteristic of the pixels included in the current block.

In operation S307, the motion vector smoothing apparatus 100 may select a highest-priority candidate motion vector from among a plurality of the candidate motion vectors which are acquired in operation S303.

In operation S309, the motion vector smoothing apparatus 100 may acquire at least one of the above-described SBAD value and SFAD value according to the candidate motion vector which is selected in operation S307. The SBAD value may denote a difference between a pixel value of the current block and a pixel value of a block of a previous image which corresponds to the current block, according to the candidate motion vector. The SFAD value may denote a difference between the pixel value of the current block and a pixel value of a block of a next image, which corresponds to the current block according to the candidate motion vector. The SBAD value and the SFAD value may indicate a degree to which a block of a corresponding reference image is similar to a current image. As the SBAD value and the SFAD value become lower, a possibility that a motion vector acquired, based on the corresponding reference image, has a value close to a true motion vector increases.

In operation S311, the motion vector smoothing apparatus 100 may determine the minimum value from among the SBAD value and SFAD value which are acquired in operation S309. That is, the motion vector smoothing apparatus 100 may select the lesser of the SBAD value and SFAD value, and compare the selected value with the threshold value.

In operation S313, the motion vector smoothing apparatus 100 may compare the minimum value, which is determined in operation S311, and the threshold value which is determined in operation S305.

If it is determined in operation S313 that the minimum value is greater than the threshold value, the motion vector smoothing apparatus 100 may determine if there is a next-priority candidate motion vector, in operation S317.

When there is the next-priority candidate motion vector, the motion vector smoothing apparatus 100 may select the next-priority candidate motion vector in operation S319, and repeat operations S309 to S313.

When there is no next-priority candidate motion vector, the motion vector smoothing apparatus 100 may determine that the motion vector, which is acquired in operation S301, as the motion vector of the current block in operation S321.

In an exemplary embodiment, when a candidate motion vector is not determined as a motion vector of a current block, it may be considered that a motion vector similar to a motion vector of an adjacent block is not determined as the motion vector of the current block. For example, when a current block includes a moving object and an adjacent block includes a background, the motion vector of the current block may not be determined as a candidate motion vector similar to a motion block of the adjacent block. Therefore, according to an exemplary embodiment, whether to determine a candidate motion vector as a motion vector of a current block may be determined based on a threshold value which is determined depending on characteristics of pixels of the current block.

Furthermore, when it is determined in operation S313 that the minimum SBAD value or SFAD value is equal to or less than the threshold value, the motion vector smoothing apparatus 100 may finally determine the candidate motion vector, which is selected in operation S307 or S319, as the motion vector of the current block.

A case in which a candidate motion vector is determined as a motion vector of a current block may correspond to a case in which an SBAD value or an SFAD value is equal to or less than a threshold value, and thus correspond to a case in which the current block is similar to blocks adjacent thereto. Alternatively, a case in which the candidate motion vector is determined as a motion vector of the current block may correspond to a case in which the threshold value is relatively high, and thus, it may be considered that the current block does not include only one object because the current block includes various pixels. That is, when variances of the pixels of the current block are high because the threshold value is relatively high, a possibility that the current block includes only one object is low, and thus, it may be considered that there is a high possibility that the motion vector of the current block is similar to motion vectors of the adjacent blocks.

Figure 4:
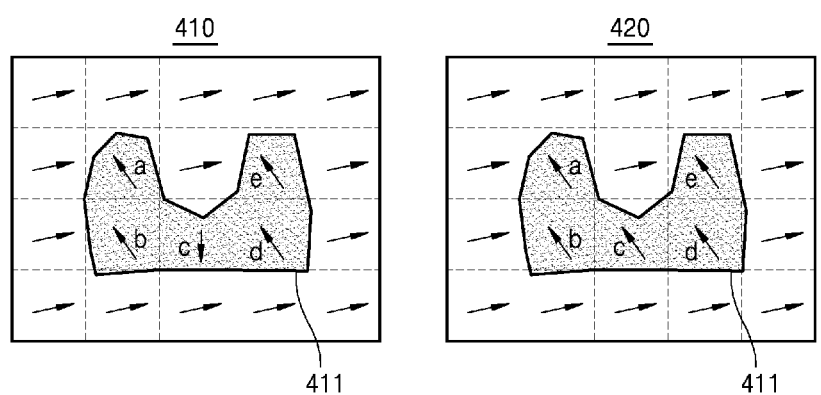
FIG. 4 is an exemplary diagram illustrating an example of smoothing a motion vector according to an exemplary embodiment.

FIG. 4 is an exemplary diagram illustrating an example of smoothing a motion vector according to an exemplary embodiment.

Referring to FIG. 4, an exemplary screen 410 that shows a motion vector of each block acquired by the motion vector acquiring unit 110 is illustrated, and an exemplary screen 420 that shows a motion vector of each block determined by the motion vector smoothing unit 140 is illustrated.

A plurality of blocks including an object 411 shown in the exemplary screen 410 may be respectively referred to as a, b, c, d, and e. Also, a plurality of blocks including an object 411 shown in the exemplary screen 420 correspond to the respective blocks a, b, c, d, and e, and may be respectively referred to as a, b, c, d, and e. The other blocks shown in the exemplary screens 410 and 420 include a background.

In the following description, it is assumed that among the motion vectors shown in the exemplary screen 410, a motion vector of the background is v0, motion vectors of the blocks a, b, d and e are va, and a motion vector of the block c is vc. The motion vectors shown in the exemplary screen 410 may be motion vectors acquired by the motion vector acquiring unit 110. Each of the motion vectors may be acquired from a block corresponding to a current block included in a previous image or a next image. That is, the respective motion vectors of the blocks may be acquired from blocks which are included in the previous image or the next image and have a minimum SBAD value or SFAD value.

In the block a, most of the blocks adjacent to the block a include the motion vector of the background, and thus, there is a high possibility that a candidate motion vector of the block a is the motion vector of the background or the motion vector of the background has the highest priority, according to an exemplary embodiment.

That is, MVD(v0) has a value "(v0−v0)*6+(v0−va)*2+(v0−vc)=(v0−va)*2+(v0−vc)", and MVD(va) has a value "(va−v0)*6+(va−va)*2+(va−vc)=(va−v0)*6+(va−vc)".

Therefore, there is a high possibility that among MVD values of motion vectors of v0, va, and vc, the MVD(v0) value is the highest. Accordingly, there is a high possibility that a candidate motion vector of the block a has a v0 value, or v0 is determined as a candidate motion vector having the highest priority. Each of va and vc may be determined as a candidate motion vector having the second highest priority after the highest priority.

However, since the block a includes a portion of the object, a motion vector of the block a may not be determined as v0, which is the candidate motion vector, in an operation of smoothing a motion vector.

Since the block a includes a portion of the object, there is a high possibility that variances of pixel values are small compared to the background, and thus, a threshold value may have a low value. Also, since the block a includes the object, the block a may have a large pixel value difference with respect to the background, and thus, an SBAD value or SFAD value of the candidate motion vector "v0" may be acquired from a block including the background in a reference image, and may have a relatively high value. Therefore, according to an exemplary embodiment, the block a has a high possibility that the SBAD value or SFAD value of the candidate motion vector "v0" is greater than the threshold value, and the block a has a high possibility that an SBAD value or SFAD value of va is less than the threshold value. Accordingly, as shown in the screen 420 according to an exemplary embodiment, the motion vector of the block a may be determined as the motion vector "va" of the block a, instead of the candidate motion vector "v0".

Since the block c includes a portion of the object, there is a high possibility that variances of pixel values are small compared to the background, and thus, a threshold value may have a low value as in the block a. A motion vector set for calculating a candidate motion vector of the block c may include the motion vector "va" of each of the blocks a, b, d and e, the motion vector "v0" of the background, and the motion vector "vc" of the block c.

Among MVD values of the respective motion vectors, MVD(v0) has a value "(v0−v0)*4+(v0−va)*4+(v0−vc)= (v0−va)*4+(v0−vc)", MVD(va) has a value "(va−v0)*4+ (va−va)*4+(va−vc)=(v0−va)*4+(va−vc)", and MVD(vc) has a value "(vc−v0)*4+(vc−va)*4+(vc−vc)". Unlike MVD values acquired from the block a, MVD values of the motion vectors of v0, va, and vc may be determined based on respective motion vector values, because the number of adjacent background blocks is equal to the number of blocks including the object.

Since the block c includes the object as in the blocks a, b, d and e, there is a high possibility that a difference between a block of the reference image (corresponding to each of the motion vectors of the blocks a, b, d and e) and the block c is small compared to the block of the background. Therefore, there is a high possibility that an SBAD value or SFAD value of each of the motion vectors of the blocks a, b, d and e is lower than the threshold value having a low value, in comparison with the motion vector of the background.

Therefore, as shown in FIG. 4, the motion vector of each of the blocks a, b, d and e may be finally determined as the motion vector of the block c.

Figure 5:
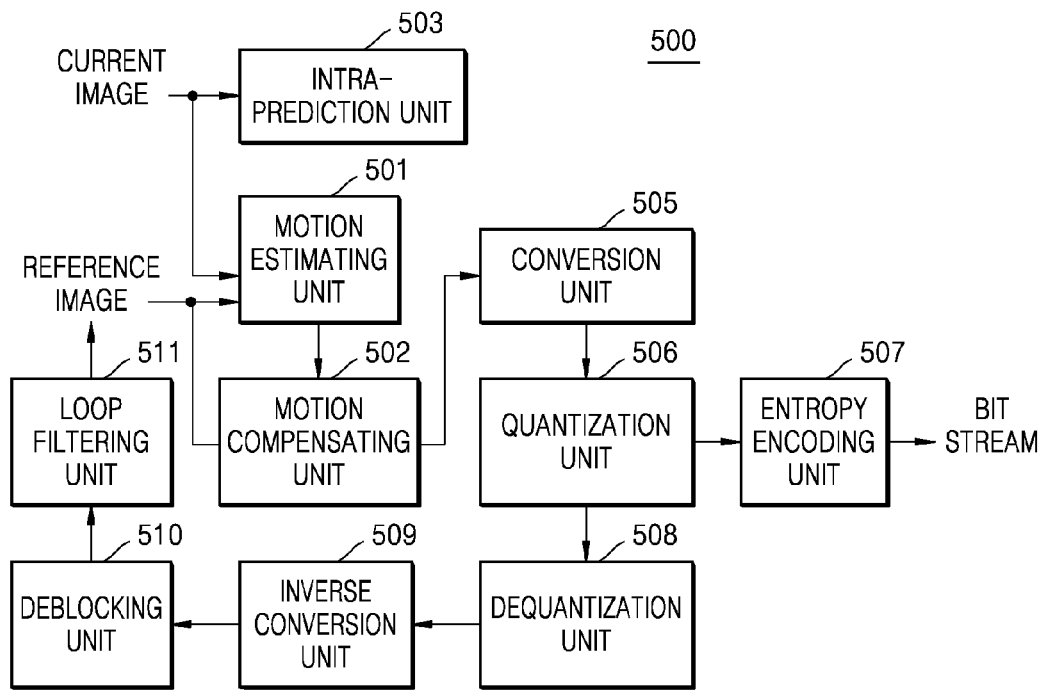
FIG. 5 is a block diagram illustrating an internal configuration of an image encoding apparatus according to an exemplary embodiment.

FIG. 5 is a block diagram illustrating an internal configuration of an image encoding apparatus 500 according to an exemplary embodiment. The image encoding apparatus 500 may estimate a motion of an image according to a motion vector smoothed by the above-described motion vector smoothing method, thereby encoding the image.

Referring to FIG. 5, the image encoding apparatus 500 according to an exemplary embodiment may include a motion estimating unit 501, a motion compensating unit 502, an intra-prediction unit 503, a conversion unit 505, a quantization unit 506, an entropy encoding unit 507, a dequantization unit 508, an inverse conversion unit 509, a deblocking unit 510, and a loop filtering unit 511.

The motion estimating unit 501 may estimate a motion of a current image by using reference images included in a reference picture set (RPS) for the current image which is an image, which is currently input from the outside, from among a plurality of images composing a video. In this case, the motion estimating unit 501 may acquire a smoothed motion vector according to motion vectors of adjacent blocks depending on a characteristic of each block, according to an exemplary embodiment, thereby estimating the motion of the current image.

The motion compensating unit 502 may generate a prediction image of the current image by using the reference images included in the RPS for the current image. In more detail, the motion compensating unit 502 may generate the prediction image of the current image by using the motion of the current image estimated by the motion estimating unit 501.

The intra-prediction unit 503 estimates blocks, which correspond to an intra-mode among a plurality of blocks composing the current image, to generate the prediction image of the current image.

The conversion unit 505 may perform a subtraction operation on the prediction image of the current image to calculate a residual image, and convert the calculated residual image from a spatial domain into a frequency domain. For example, the conversion unit 505 may convert the residual image from the spatial domain into the frequency domain by using integer conversion, such as a discrete Hadamard transform (DHT) or a discrete cosine transform (DCT).

The quantization unit 506 may quantize results obtained through a conversion of the conversion unit 505.

The entropy encoding unit 507 may entropy-encode results obtained through quantization by the quantization unit 506 to generate a bit stream. In particular, the entropy encoding unit 507 may entropy-encode information (for example, RPS information used for inter-prediction, motion vector information, and position information of an adjacent block used for intra-prediction) used to decode a video, in addition to the results obtained through the quantization by the quantization unit 506.

The dequantization unit 508 may dequantize the results obtained through the quantization by the quantization unit 506.

The inverse conversion unit 509 may convert results (i.e., conversion coefficient values), obtained through dequantization by the dequantization unit 508, from the frequency domain into the spatial domain, to restore the residual image of the prediction image and the current image.

The deblocking unit 510 and the loop filtering unit 511 may adaptively filter an image obtained through the restoration of the inverse conversion unit 509.

Figure 6:
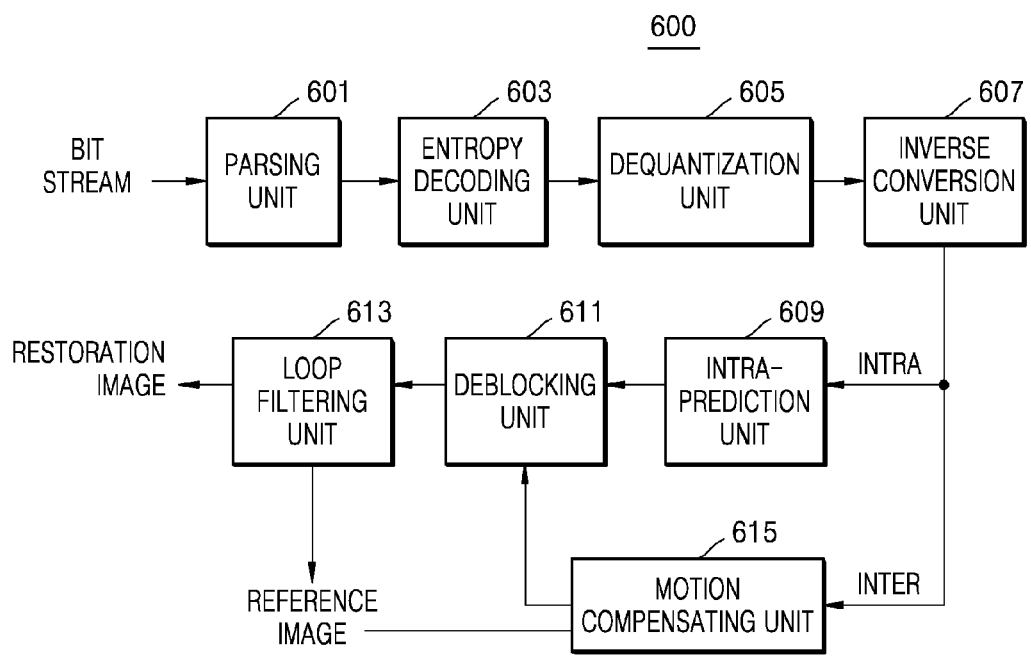
FIG. 6 is a block diagram illustrating an internal configuration of an image decoding apparatus according to an exemplary embodiment.

FIG. 6 is a block diagram illustrating an internal configuration of an image decoding apparatus 600 according to an exemplary embodiment. The image decoding apparatus 600 may generate a prediction image according to a motion vector smoothed by the above-described motion vector smoothing method, thereby decoding an image.

Referring to FIG. 6, the image decoding apparatus 600 according to an exemplary embodiment may include a parsing unit 601, an entropy decoding unit 603, a dequantization unit 605, an inverse conversion unit 607, an intra-prediction unit 609, a motion compensating unit 615, a deblocking unit 611, and a loop filtering unit 613.

The parsing unit 601 may parse encoded image data, which is to be decoded from a bit stream, and encoding information necessary for decoding.

The entropy decoding unit 603 may entropy-decode the bit stream to restore pieces of information used to decode a video.

The dequantization unit 605 may dequantize values obtained through the restoration of the entropy decoding unit 603 to restore a plurality of conversion coefficient values.

The inverse conversion unit 607 may convert the conversion coefficient values, obtained through the restoration by the dequantization unit 605, from the frequency domain into the spatial domain to restore a residual image of a prediction image and a current image.

The intra-prediction unit 609 may predict a value of a block of the current image from a value of a restoration block, which is located at a position adjacent to the block of the current image, from among a plurality of blocks composing the restored current image, for each of blocks corresponding to an intra-mode among the plurality of blocks composing the current image, thereby generating a prediction image of the current image. Thus, a restoration image is generated by adding the residual image to the prediction image.

The motion compensating unit 615 may generate the prediction image of the current image from reference images included in the RPS used for the prediction decoding of the current image. Thus, the restoration image is generated by adding the residual image to the prediction image. In this case, the motion compensating unit 615 may generate the prediction image of the current image by using a motion vector which is determined based on motion vectors of adjacent blocks depending on a characteristic of each block.

The deblocking unit 611 and the loop filtering unit 613 may adaptively filter the restoration image.

As described above, according to the one or more of the above exemplary embodiments, a motion vector of a current block may be smoothed depending on a characteristic of the current block.

The method according to an exemplary embodiment may be implemented as a code readable by a computer (a computer-readable recording medium having information processing capable devices). The computer-readable recording medium includes various types of storage devices that store data readable by a computer system. Examples of computer-readable recording devices include ROM, RAM, CD-ROM, magnetic tapes, floppy disks, and optical data storage devices.

It should be understood that the exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A motion vector smoothing method comprising:
   acquiring motion vectors of at least one block of a current image by using a reference image;
   acquiring at least one candidate motion vector of a current block from among a motion vector of the current block and one or more motion vectors of one or more blocks adjacent to the current block;
   determining a threshold value of the current block according to difference values between pixel values included in the current block;
   acquiring a block of the reference image corresponding to the current block according to the at least one candidate motion vector of the current block for each of the at least one candidate motion vector of the current block;
   determining a difference value between a pixel value of the acquired block of the reference image and a pixel value of the current block for each of the at least one candidate motion vector of the current block;
   determining the motion vector of the current block from among the at least one candidate motion vector, based on the threshold value and the determined difference value; and
   displaying the current image based on the determined motion vector.

2. The motion vector smoothing method of claim 1, wherein the determining of the difference value comprises:
   determining a block, having a small difference value between a pixel of the block and the pixel value of the current block, from a block of a previous image, corresponding to the current block of the current image, and a block of a next image, corresponding to the current block of the current image; and
   determining the difference value according to a result of the determining.

3. The motion vector smoothing method of claim 1, wherein the determining of the threshold value comprises determining the threshold value of the current block using a level of noise included in the current block.

4. The motion vector smoothing method of claim 1, wherein the determining of the threshold value comprises:
   summating at least one of gradient values of each of a plurality of pixels, included in a single block, in an X axis direction and a Y axis direction; and
   determining the threshold value of the current block, based on the summated value,
   wherein the gradient values are determined from a sum of difference values between the pixel values included in the current block.

5. The motion vector smoothing method of claim 1, wherein the acquiring of the a least one candidate motion vector comprises:
   acquiring the at least one candidate motion vector from among the motion vector of the current block and the motion vectors of the at least one block adjacent to the current block; and
   determining a priority of the at least one candidate motion vector, and
   the determining of the motion vector comprises determining the motion vector of the current block according to the threshold value, based on the priority of the acquired at least one candidate motion vector.

6. The motion vector smoothing method of claim 5, wherein the determining of the motion vector comprises:
   determining a first-priority candidate motion vector based on the priority of each of the at least one candidate motion vector;
   comparing the threshold value and a pixel value difference between a pixel value of a block of the reference image and a pixel value of a block of the current image according to the first-priority candidate motion vector, wherein the block of the reference image corresponds to the block of the current image;
   determining whether to determine the first-priority candidate motion vector as the motion vector of the current block, according to a result of the comparing; and
   determining a next-priority candidate motion vector as the motion vector of the current block according to a result of the determining, based on the threshold value.

7. The motion vector smoothing method of claim 5, wherein the determining of the priority comprises determining the priority according to a difference value between the acquired at least one candidate motion vector and a motion vector of a block adjacent to the current block.

8. A non-transitory computer-readable storage medium storing a program for executing the motion vector smoothing method of claim 1.

9. A motion vector smoothing apparatus comprising:
a computer processor that acquires motion vectors of at least one block of a current image by using a reference image,
acquires at least one candidate motion vector of a current block from among a motion vector of the current block and one or more motion vectors of one or more blocks adjacent to the current block,
determines a threshold value of the current block according to a difference value between pixels values included in the current block,
acquires a block of the reference image corresponding to the current block according to the at least one candidate motion vector of the current block for each of the at least one candidate motion vector of the current block,
determines a difference value between a pixel value of the acquired block of the reference image and a pixel value of the current block for each of the at least one candidate motion vector of the current block, and
determines the motion vector of the current block from among the at least one candidate motion vector, based on the threshold value and the determined difference value; and
a display that displays the current image based on the determined motion vector.

10. The motion vector smoothing apparatus of claim 9, wherein the computer processor determines a block, having a small difference value between a pixel of the block and the pixel value of the current block, from a block of a previous image, corresponding to the current block of the current image, and a block of a next image, corresponding to the current block of the current image, and determines the difference value according to a result of the determining.

11. The motion vector smoothing apparatus of claim 9, wherein the computer processor determines the threshold value of the current block using a level of noise included in the current block.

12. The motion vector smoothing apparatus of claim 9, wherein the computer processor summates at least one of gradient values of each of a plurality of pixels, included in a single block, in an X axis direction and a Y axis direction, and determines the threshold value of the current block, based on the summated value,
wherein the gradient values are determined from a sum of difference values between the pixel values included in the current block.

13. The motion vector smoothing apparatus of claim 9, wherein the computer processor determines at least one candidate motion vector from among the motion vector of the current block and the motion vectors of the at least one block adjacent to the current block, and determines a priority of the at least one candidate motion vector, and
the computer process determines the motion vector of the current block according to the threshold value, based on the priority of the acquired at least one candidate motion vector.

14. The motion vector smoothing apparatus of claim 13, wherein the computer processor determines a first-priority candidate motion vector based on the priority of each of the at least one candidate motion vector, compares the threshold value and a pixel value difference between a pixel value of a block of the reference image and a pixel value of a block of the current image according to the first priority candidate motion vector, wherein the block of the reference image corresponds to the block of the current image, determines whether to determine the first-priority candidate motion vector as the motion vector of the current block, according to a result of the comparing, and determines a next-priority candidate motion vector as the motion vector of the current block according to a result of the determining, based on the threshold value.

15. The motion vector smoothing apparatus of claim 13, wherein the computer processor determines the priority according to a difference value between the acquired at least one candidate motion vector and a motion vector of a block adjacent to the current block.

* * * * *